US007701962B2

(12) United States Patent
Utsunomiya et al.

(10) Patent No.: US 7,701,962 B2
(45) Date of Patent: Apr. 20, 2010

(54) WIRELESS COMMUNICATION APPARATUS AND WIRELESS COMMUNICATION METHOD (75) Inventors: Yoriko Utsunomiya, Tokyo (JP); Tomoko Adachi, Urayasu (JP); Masahiro Takagi, Tokyo (JP); Tetsu Nakajima, Yokohama (JP); Tomoya Tandai, Tokyo (JP); Yasuyuki Nishibayashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1239 days.

(21) Appl. No.: 11/201,208

(22) Filed: Aug. 11, 2005

(65) Prior Publication Data

US 2006/0114928 A1 Jun. 1, 2006

(30) Foreign Application Priority Data

Nov. 30, 2004 (JP) ............................. 2004-347778

(51) Int. Cl.
*H04L 12/413* (2006.01)
(52) U.S. Cl. ...................................... 370/445
(58) Field of Classification Search ................. 370/448, 370/445
See application file for complete search history.

(56) References Cited

U.S. PATENT DOCUMENTS

| 5,535,395 | A | * | 7/1996 | Tipley et al. ................. 710/241 |
| 6,466,069 | B1 | * | 10/2002 | Rozenblit et al. ............ 327/157 |
| 7,136,361 | B2 | * | 11/2006 | Benveniste ................ 370/310.2 |
| 2002/0126635 | A1 | * | 9/2002 | Sugiyama et al. ............ 370/329 |
| 2002/0163933 | A1 | * | 11/2002 | Benveniste ................... 370/465 |
| 2003/0171116 | A1 | * | 9/2003 | Soomro ........................ 455/434 |
| 2004/0137906 | A1 | * | 7/2004 | Nakao et al. ................. 455/450 |
| 2005/0180314 | A1 | * | 8/2005 | Webster et al. .............. 370/208 |
| 2005/0281220 | A1 | * | 12/2005 | Stanwood et al. ............ 370/328 |
| 2005/0286446 | A1 | * | 12/2005 | Barber ........................ 370/278 |

FOREIGN PATENT DOCUMENTS

| JP | 2001-237839 | 8/2001 |
| JP | 2003-87856 | 3/2003 |
| WO | WO 2004/088886 A2 | 10/2004 |

OTHER PUBLICATIONS

U.S. Appl. No. 11/385,736, filed Mar. 22, 2006, Utsunomiya et al.
U.S. Appl. No. 11/557,636, filed Nov. 8, 2006, Takagi et al.
U.S. Appl. No. 11/857,841, filed Sep. 19, 2007, Utsunomiya et al.

* cited by examiner

*Primary Examiner*—Kevin C Harper
*Assistant Examiner*—Sai-Ming Chan
(74) *Attorney, Agent, or Firm*—Oblon, Spivak, McClelland, Maier & Neustadt, L.L.P.

(57) ABSTRACT

A wireless communication apparatus for performing wireless communication using a first channel having a first frequency bandwidth, and a second channel formed of both the first channel and a second communication channel, the second communication channel having a frequency bandwidth equal to the first frequency bandwidth. A first generation of a first declaration frame for declaring occupation of the first channel for a specified period, and a second generation of a second declaration frame for declaring occupation of the second communication channel for a specified period after the first declaration frame are generated and transmitted. Transmission timings are set so that the first and second declaration frames are transmitted at the highest priority of all the other frames.

8 Claims, 8 Drawing Sheets

WIRELESS COMMUNICATION APPARATUS AND WIRELESS COMMUNICATION METHOD

CROSS-REFERENCE TO RELATED APPLICATIONS

This application is based upon and claims the benefit of priority from prior Japanese Patent Application No. 2004-347778, filed Nov. 30, 2004, the entire contents of which are incorporated herein by reference.

BACKGROUND OF THE INVENTION

1. Field of the Invention

The present invention relates to wireless communication performing media access control on the basis of a carrier sense state, more specifically relates to a wireless communication apparatus and a wireless communication method for allowing a plurality of users to share and use a plurality of channels.

2. Description of the Related Art

Media access control (MAC) is control for determining how a plurality of communication apparatuses to make communication by sharing the same medium should use the medium to transmit communication data. By performing MAC, an event (a so-called collision) that a communication apparatus on reception side cannot separate the communication data is reduced even if two or more communication apparatuses simultaneously transmit the communication data by using the same medium. An event that a medium is not used by any communication apparatus is reduced by the MAC although a communication apparatus having a transmission request is present.

In wireless communication, it is hard for a communication apparatus to monitor transmission data while transmitting data, so that the MAC not based on collision detection is required. The IEEE 802.11 being a representative technology standard for wireless local area network (LAN) adapts carrier sense multiple access with collision avoidance (CSMA/CA).

CSMA/CA in IEEE 802.11 sets a period (referred to as duration) until a series of sequences composed of one or more frame exchanges succeeding from the corresponding MAC frame achieves the termination for a header of a MAC frame. A communication apparatus having no relation to the sequences and having no transmission right during the duration waits for transmission by determining a virtually occupied state of a medium. Thereby, occurrence of the collision is avoided. In contrast, a communication apparatus having no transmission right in the sequences recognizes that the medium is not used other than the period with the medium is actually occupied therein.

IEEE 802.11 defines that a combination of a virtual carrier sense of a MAC layer like the former and a physical carrier sense of a physical layer like the latter determines a state of the medium and the MAC is performed on the basis of the resulting determination.

Jpn. Pat. Appln. KOKAI Publication No. 2003-87856 discloses a method for achieving a wireless base station sharable by a plurality of wireless LAN systems in a wireless communication system with a plurality of wireless LAN systems different in physical layers coexisted therein. Specifically, the shared wireless base station generates a first notification signal of a first physical layer and a second notification signal of a second physical layer one after another to transmit them to a wireless terminal and switches between the first and the second physical layers in synchronous with the first and the second notification signals. A wireless terminal corresponding to the first physical layer can access only for a specified time from a time of transmission of the first notification signal and a wireless terminal corresponding to the second physical layer can access only for a specified time from a time of transmission of the second notification signal.

IEEE 802.11 conventionally adopting the CSMA/CA has been achieving a high communication speed by mainly changing protocol in a physical layer. With respect to the 2.4-GHz band, IEEE 802.11 (established in 1997, communication speed=2 Mbps) has changed to IEEE 802.11b (established in 1999, communication speed=11 Mbps) and, moreover, has changed to IEEE 802.11g (established in 2003, communication speed=54 MHz). With regard to 5-GHz band, only IEEE 802.11a (established in 1999, communication speed=54 MHz) currently exists as a standard specification.

There exists a method for expanding the bandwidth of a channel as one for approaching a high communication speed. Jpn. Pat. Appln. KOKAI Publication No. 2003-06323 conventionally presented a communication system for performing MAC to different channels coexisting within the same frequency band in the case that the frequency band of the channel is expanded.

Jpn. Pat. Appln. KOKAI Publication No. 2003-06323 describes the communication system which achieves broadband communication with a plurality of channels used simultaneously therein by MAC to make a reservation for a plurality of channels one by one in order. However, since a control frame to reserve a channel for broadband communication is also transmitted in accordance with the same channel access procedures as those of other control frame and other data frame, the described communication system cannot assure a channel for the broadband communication without having to win a competition. That is, the conventional communication system cannot always surely start the broadband communication. Therefore, it is necessary for a secured start of the broadband communication to give a channel access right with a high priority to the control frame to reserve a plurality of channels for the broadband communication.

A system for performing channel access according to parameters due to priority class has already proposed, in which the system gives a priority class to data frame in response to a kind of data as IEEE 802.11e of a wireless LAN specification gives to the data frame. Also with respect to a control frame, a system for setting a priority class corresponding to a type of the following data frame to the control frame has already proposed. For example, at the time of transmission of an RTS/CTS frame, the proposed system performs channel access in accordance with a parameter of a priority class corresponding to the type of the following data.

However, a system for performing channel access by setting a priority class to a control frame itself independently of the kind of the following data frame has not presented yet. Especially, it is not proposed that the determination whether a priority of channel access should be given or not to the control frame on the basis of the fact whether or not a control frame for a channel reservation for the broadband communication.

Jpn. Pat. Appln. KOKAI Publication No. 2003-06323 does not take into account at all a time required to switch a channel or a communication bandwidth caused at the time of channel access to a different frequency band. Accordingly, the system disclosed by Jpn. Pat. Appln. KOKAI Publication No. 2003-06323 degrades use efficiency of a channel if it takes a long time to switch the channel or the communication bandwidth.

When the system described above makes communication among terminals differing switching times of the channel or the communication band from one another, if a source terminal has no information about the switching time of the channel or the communication bandwidth at a destination terminal, a frame is occasionally transmitted before completion of switching of the channel or communication bandwidth at the destination terminal.

BRIEF SUMMARY OF THE INVENTION

An object of the invention is to provide a wireless communication apparatus and a wireless communication method for surely setting up broadband communication so as to contribute improvement of use efficiency of a channel.

A wireless communication apparatus according to an aspect of the present invention includes a wireless communication apparatus for performing wireless communication with a wireless terminal using a first channel having a first frequency bandwidth, and a second channel formed of both the first channel and a second communication channel, the second communication channel having a frequency bandwidth equal to the first frequency bandwidth, comprising: an indication device configured to indicate a first generation of a first declaration frame for declaring occupation of the first channel for a specified period, and a second generation of a second declaration frame for declaring occupation of the second communication channel for a specified period after the first declaration frame is generated and transmitted; a transmitting device configured to generate and transmit the first declaration frame and the second declaration frame in accordance with indications of the first generation and the second generation, respectively; and a communication device configured to communicate with the wireless terminal using the second channel after the second declaration frame has transmitted, wherein the indication device is capable of setting a parameter for determining a transmission timing of frames, and sets the parameter so that the first and second declaration frames are transmitted at the highest priority of all the other frames.

DETAILED DESCRIPTION OF THE INVENTION

A wireless communication system for searching frequency channels before making communication includes IEEE Std. 802.11-1999 (revision 2003 including: ISO/IEC 8802-11-1999(E); ANSI/IEEE Std. 802.11-1999 edition; IEEE Std. 802-11a-1999; IEEE Std. 802.11b-1999; IEEE Std 802.11b-1999; IEEE Std. 802.11b-1999/Cor 1-2001; and IEEE Std. 802.11d-2001). Hereinafter, a basic system configuration will be explained on the basis of the IEEE 802.11 wireless LAN system. The IEEE 802.11 standard specification is one respecting to a physical (PHY) layer and a medium access control (MAC) layer. The following process will be explained by mainly taking notice of the process in the MAC layer. The IEEE 802.11 standard specification also contains a standard specification positioned as an amendment and a recommended practice.

First Embodiment

Figure 1:
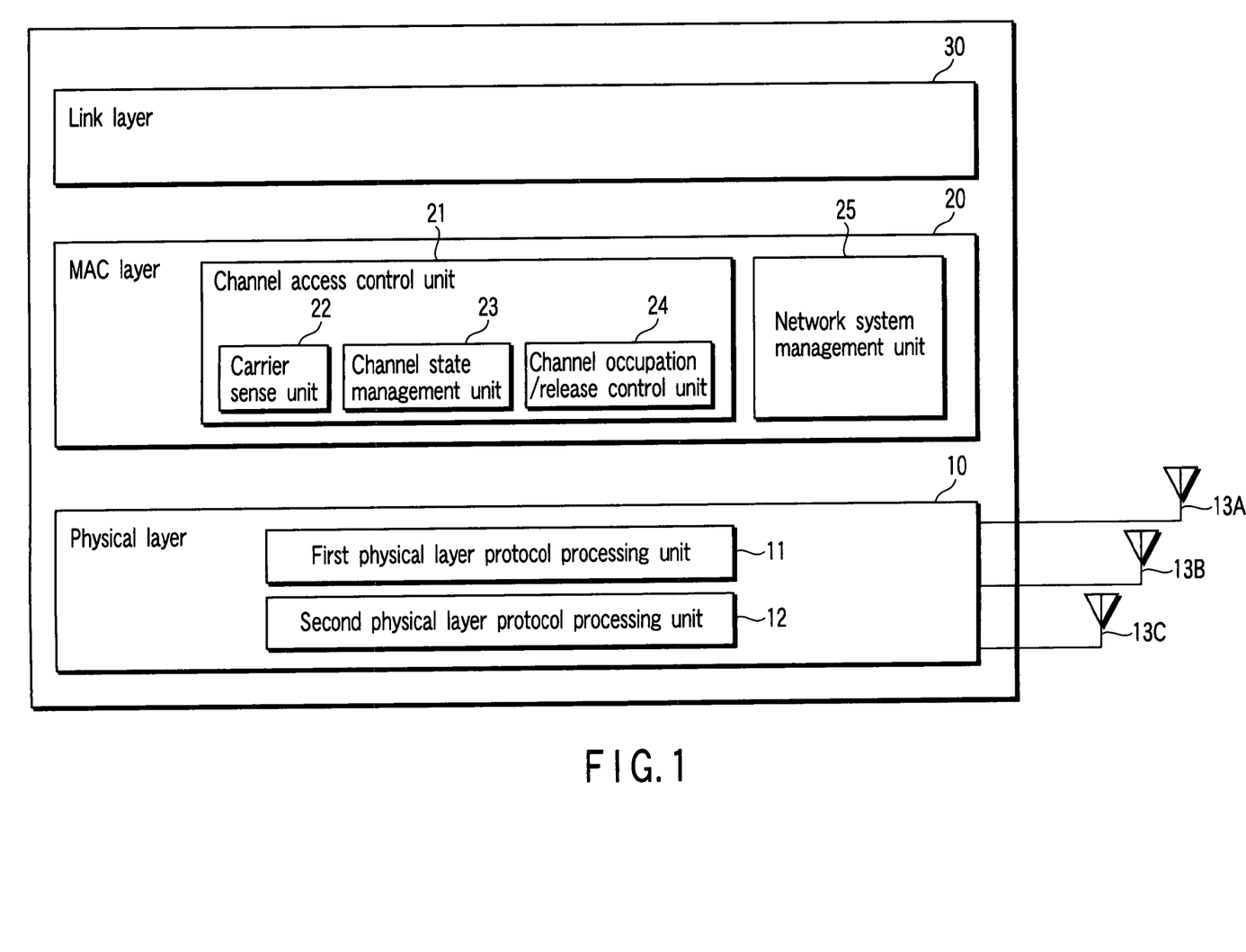
FIG. 1 is a block diagram of a first wireless communication apparatus regarding a first embodiment of the invention.

As shown in FIG. 1, a wireless communication apparatus in accordance with a first embodiment of the invention includes a PHY layer 10, a MAC layer 20 and a link layer 30 by roughly classifying. In FIG. 1, the PHY layer 10 corresponds to two kinds of PHY layer protocols differing in bandwidth in use. That is, the PHY layer 10 has a first PHY layer protocol processing unit 11 for performing PHY layer protocol processing to communicate by using a first channel with a first communication bandwidth and a second PHY layer protocol processing unit 12 for performing PHY processing to communicate by using a second channel having a second communication bandwidth greater than the first communication bandwidth and overlapping with the first communication bandwidth. The first processing unit 11 and the second processing unit 12 frequently share a circuit with each other in terms of actual mounting and they are not exactly independent with each other.

The protocol processed in processing of the first processing unit 11 includes at least, for example, the PHY protocol defined by IEEE 802.11a. The first bandwidth used by the first processing unit 11 is set, for example, to 20 MHz. The first processing unit 11 may use a technique of a so-called Multiple Input Multiple Output (MIMO) by which each of a plurality of antennas 13A-13C is used on a transmission side and a reception side, respectively. The MIMO technique is one with a high possibility to be applied to the IEEE 802.11 task group n (TGn) intending to achieve higher throughput of IEEE 802.11.

The second processing unit 12 uses, for example, either a Single Input Single Output (SISO) or the MIMO, technique or both techniques. The second communication bandwidth used by the second processing unit 12 is set, for example, to 40 MHz. The first communication bandwidth exists within the second communication bandwidth.

The MAC layer 20 has a channel access control unit 21 which has a carrier sense unit 22, a channel state management unit 23 and a channel occupancy/open control unit 24.

The MAC layer 20 controls the PHY layer 10 and exchanges data with the PHY layer 10. Data which is forwarded from the MAC layer 20 to the PHY layer 10 is processed according to one of the first PHY layer protocol and the second PHY layer protocol in the PHY layer 10, in response to the indication from the MAC layer 20. The processed data is transmitted from the antennas. On the other hand, data received by the antennas is decoded according to one of the first PHY layer protocol and the second PHY layer protocol in the PHY layer 10. The decoded data is in turn forwarded to the MAC layer 20.

MAC layer 20 forwards not only data, but also control signals to the PHY layer 10. For instance, selecting one of the first PHY layer protocol processing unit 11 and the second PHY layer protocol processing unit 12 for the signal processing of the to be processed data, is controlled by a control signal provided from the MAC layer 20 to the PHY layer 10. The MAC layer 20 further has a network system management unit 25 which 25 generates a beacon frame; manages association; and appropriately expands the network system described below.

The carrier sense unit 22 manages an empty/occupation (idle/busy) state of a channel by managing a carrier sense state with a combination of actual carrier sense information acquired from the PHY layer 10 and virtual carrier sense information acquired by the protocol of the MAC layer 20. That is, the carrier sense unit 22 does not manage a single idle/busy state of the channel but manages idle/busy states of more than one first channel in the first bandwidth and more than one second channel in the second bandwidth.

The channel occupation/release control unit 24 generates frames to control the virtual carrier sense state of the MAC layer 20 necessary to occupy a channel for a specified period or release the occupied channel. The frames generated by the control unit 24 are transmitted to the PHY layer 10 and transmitted by the first processing unit 11 and the second processing unit 12.

The channel state control unit 23 make the carrier sense unit 22 and channel occupation/release control unit 24, and also the first and the second protocol processing units 11, 12 of the PHY layer 10 cooperatively operate so as to perform desired channel access control.

The channel state control unit 23 also determines, for each of the frames, the values of channel access parameters according to the priority of the frames and notifies the channel access parameters to the PHY layer 10. The channel access parameters may represent the waiting time before transmission of frames or the maximum value in backoff period of a channel access. The PHY layer 10 transmits the frames according to the channel access parameters notified from the MAC layer 20.

As a specific example of the wireless communication apparatus which is shown in FIG. 1, for example, a 40-/20-MHz MIMO STA (AP) and a 40-/20-MHz STA (AP) are presented. The 40-/20-MHz MIMO STA (AP) is a terminal (or AP) capable of transmitting and receiving SISO through the 20-MHz channel, MIMO through the 20-MHz channel, SISO through the 40-MHz channel and MIMO through the 40-MHz channel. The 40-/20-MHz STA (AP) is a terminal (or AP) capable of transmitting and receiving SISO through the 20-MHz channel and MIMO through the 40-MHz channel. In terms of the Link layer 30, it is assumed that it has a function of a usual link layer defined in IEEE 802.

Figure 2:
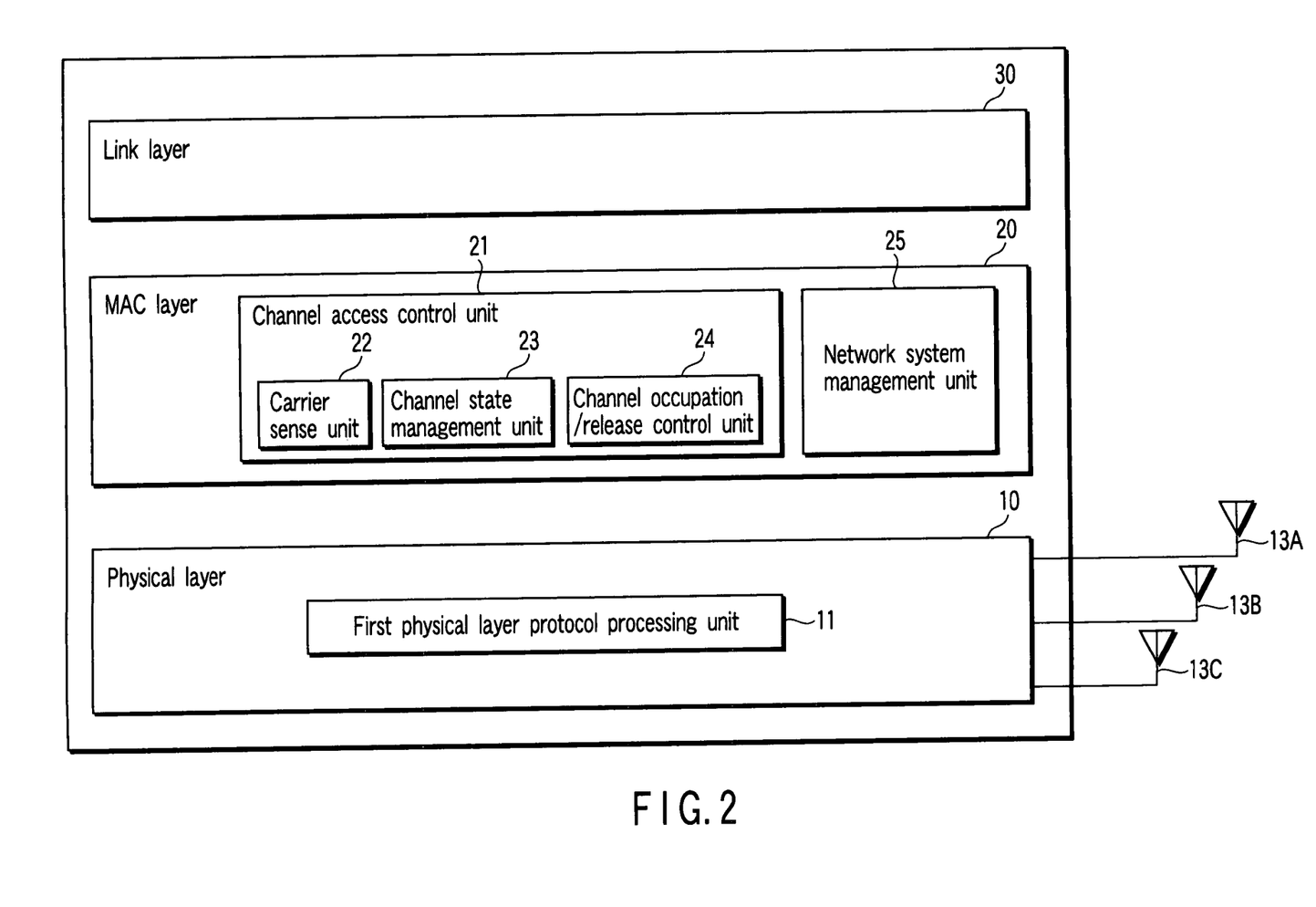
FIG. 2 is a block diagram of a second wireless communication apparatus regarding the first embodiment of the invention.

Another wireless communication apparatus shown in FIG. 2 differs from the wireless communication apparatus shown in FIG. 1 at a point that the PHY layer 10 does not include the second PHY protocol processing unit 12 shown in FIG. 1. The another wireless communication apparatus shown in FIG. 2 is similar to the communication apparatus shown in FIG. 1 in the following points: the first communication bandwidth of the first PHY layer protocol processing unit 11 is 20-MHz in nominal terms; the MIMO technique may be or may not be included; and the MAC layer 20 and the link layer 30 are provided.

Since the wireless communication apparatus shown in FIG. 2, however, only performs the MAC based on the first processing unit 11, the detail in operations of the MAC layer 20 in FIG. 2 partially differs from the communication apparatus shown in FIG. 1. If the processing unit 11 does not include the MIMO technique, the communication apparatus shown in FIG. 2 may be an existing apparatus corresponding at least one of IEEE 802.11a, IEEE 802.11b and IEEE 802.1g.

A specified example of the communication apparatus shown in FIG. 2 includes, for example, the 20-MHz MIMO STA (AP) and the 20-MHz STA (AP). The 20-MHz MIMO STA (AP) is a terminal (or AP) capable of transmitting and receiving SISO through the 20-MHz channel and MIMO through the 20-MHz channel. The 20-MHz STA (AP) is a terminal (or AP) capable of transmitting and receiving SISO through the 20-MHz channel.

Figure 3:
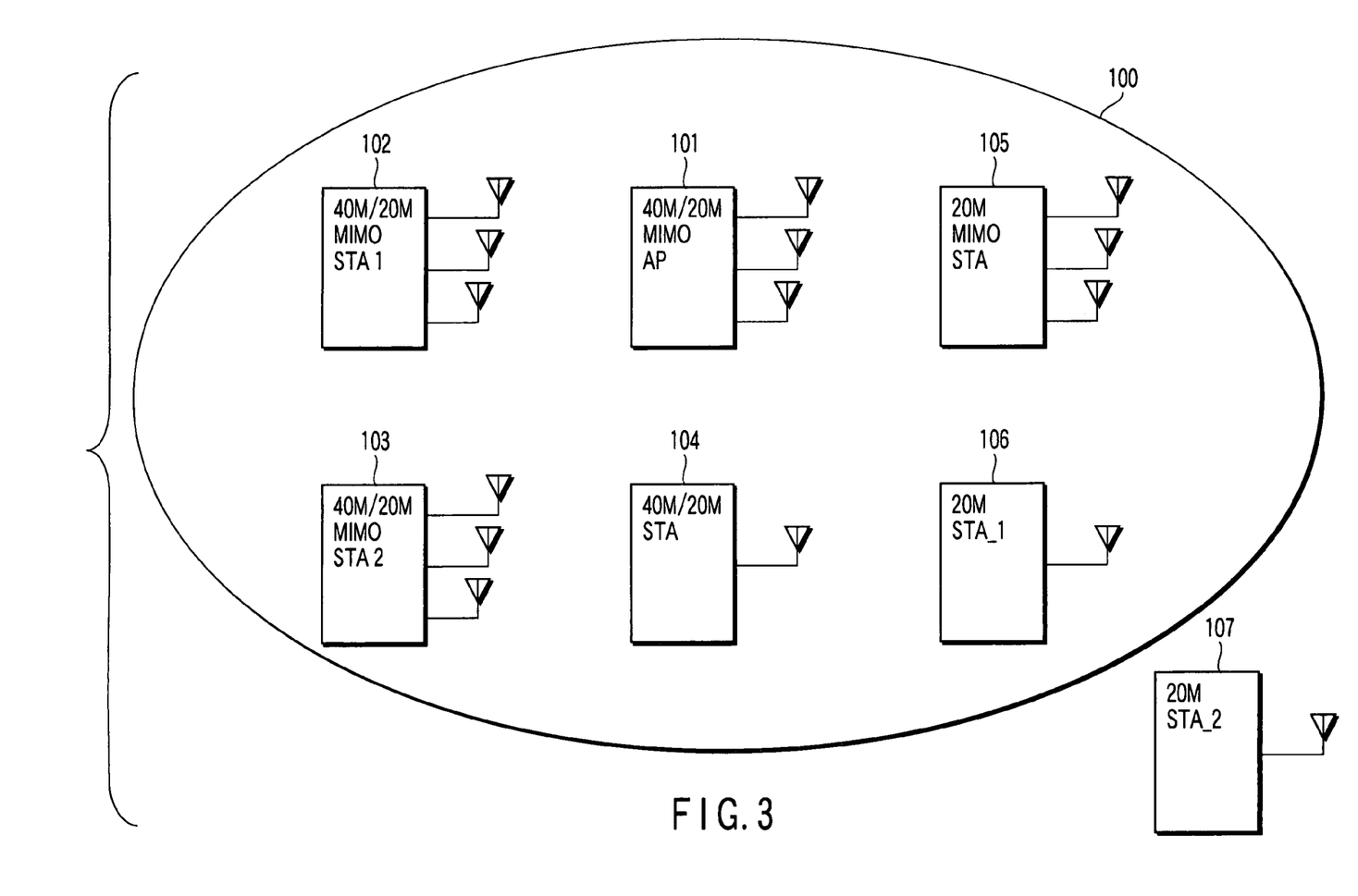
FIG. 3 is an illustration showing an example of a network including a wireless communication apparatus regarding the first embodiment of the invention.

An example of a network 100 including the wireless communication apparatus shown in FIG. 1 and FIG. 2 is shown in FIG. 3. A base station 101 in the network 100 is an AP corresponding to the 40-/20-MHz MIMO AP. Terminals 102-106 establish association with the base station 101. Here, the terminal 102 is a 40-/20-MHz MIMO STA_1, the terminal 103 is a 40-/20-MHz MIMO STA_2, the terminal 104 is a 40-/20-MHz STA, the terminal 105 is a 20-MHz MIMO STA, and the terminal 106 is a 20-MHz MIMO STA_1. It is assumed that another terminal 107 is a 20-MHz MIMO STA_2 and belongs to a network other than the network 100, for example, a network using 20M_ch_b.

Figure 4A:
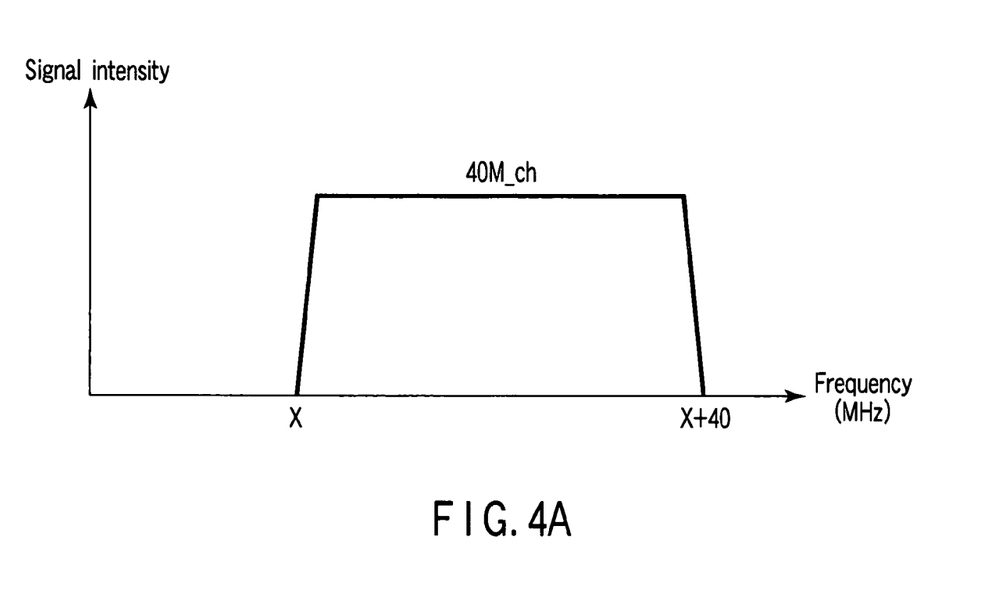
FIGS. 4A and 4B are illustrations explaining a first channel within a first frequency band and a second channel within a second frequency band in the first embodiment of the invention.
Figure 4B:
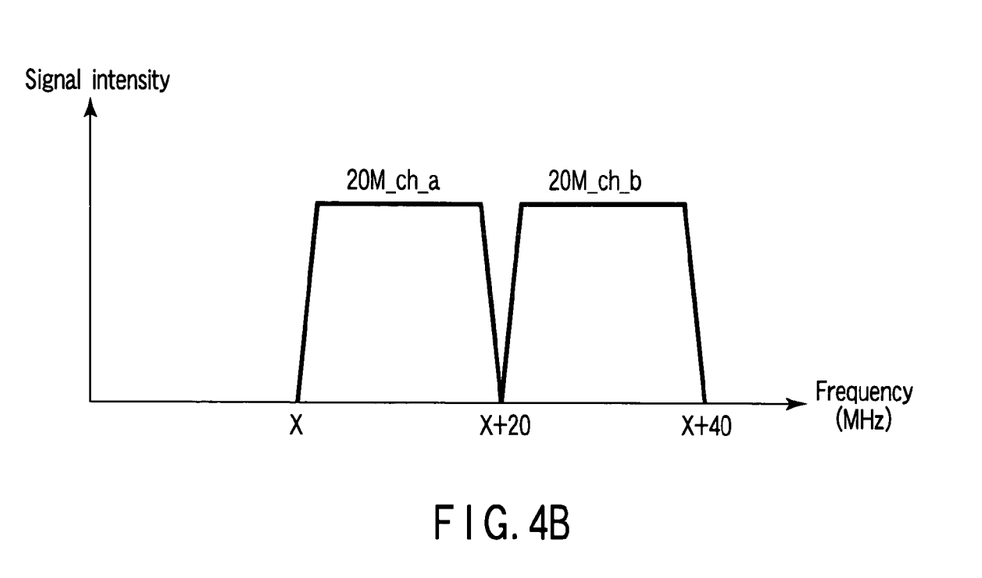

The network 100 shown in FIG. 3 has a channel 20M_ch_a of 20 MHz using a frequency band of X MHz-(X+20) MHz and a channel 40M_ch of 40 MHz using a frequency band of X MHz-(X+40) MHz as communication channels as schematically shown in FIG. 4. Accordingly, the frequency band of the X MHz-(X+20) MHz is redundantly used for both 20-MHz and 40-MHz channels. Another channel 20M_ch_b of 20 MHz using the frequency band of (X+20) MHZ-(X+40) MHz is not used by the network 100 shown in FIG. 3, but it used occasionally in the other network.

In the network 100, a channel 40M_ch of 40 MHz and either of two channels 20M_ch_a or 20M_ch_b of 20 MHz overlapping with the 40M_ch in terms of frequency are used. In other words, it is assumed that the 40-/20-MHz MIMO STA and the 40-/20-MHz STA belonging to the network 100 do not simultaneously treat the 20M_ch_a and the 20M_ch_b.

Figure 5:
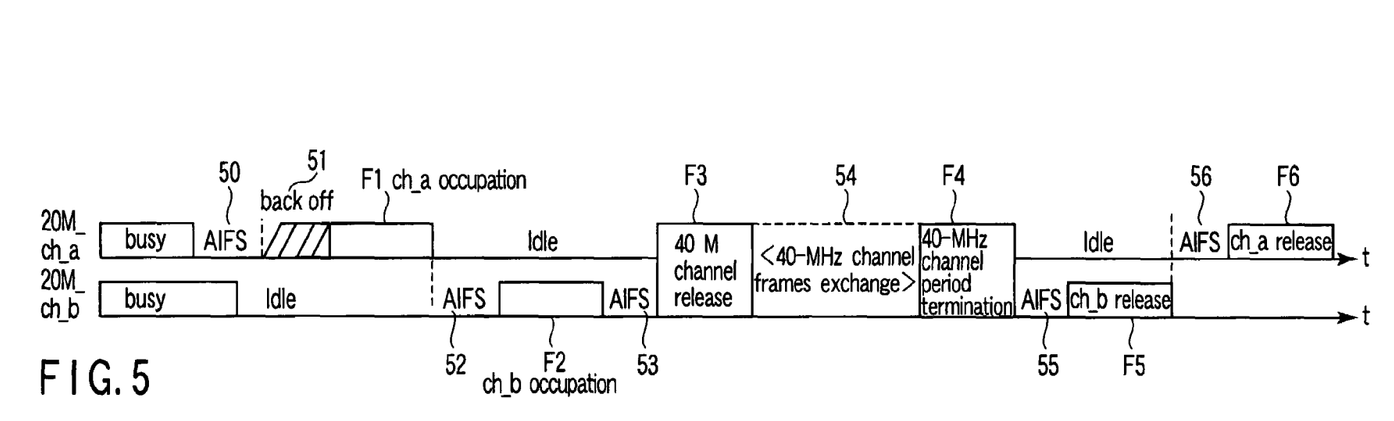
FIG. 5 is an illustration explaining a media access control system regarding the first embodiment of the invention.

The first embodiment especially shows consideration to the media access control system in such a network shown in FIG. 3. FIG. 5 shows a time-series outline of exchange of main frames necessary for controlling. In an example shown in FIG. 5, a 40-/20-MHz MIMO AP being a base station 101 controls switching between a period (20M_ch_a period) to make communication by using the 20M_ch_a and a period (40M_ch period) to make communication by the use of the 40M_ch. Within the 20M_ch_a period and the 40M_ch period, PCF (Point Coordination Function) or HCCA (HCF controlled Channel Access) may be performed wherein media access is controlled by the base station 101 which performs polling for centralized control on terminals 102 to 106. DCF (Distributed Coordination Function) or EDCA (Enhanced Distributed Channel Access) may as well be performed wherein each terminal 102 to 106 evenly performs media access control.

In FIG. 5, the MAC system makes communication by using the 20M_ch_a in the network 100 at the beginning, after this, returns back to the 20M_ch_a across the 40M_ch period. The MAC system utilized the 20M_ch_a and the 40M_ch for communication in the network 100, however, the 20M_ch_b using a frequency overlapping with the 40M_ch to use the 40M_ch is brought into no use for the communication. The 20M_ch_b would be used in another network adjacent to the network 100 or would not be used at all.

Hereinafter, operation procedures regarding the first embodiment will be described by referring to FIG. 4 and FIG. 5. It is assumed that, in the beginning, the 40-/20-MHz MIMO AP, the 40-/20-MHz MIMO STA, the 40-/20-MHz STA, the 20-MHz MIMO STA (20M_ch_a) and the 20-MHz STA (20M_ch_a) operate through 20M_ch_a. It is assumed that the 20-MHz MIMO STA (20M_ch_b) and the 20-MHz STA (20M_ch_b) operate through 20M_ch_b.

In this situation, it is assumed that the channel state management unit 23 of the 40-/20-MHz MIMO AP (base station 101 in FIG. 4) determines to start procedures of switching to the 40M_ch. Based upon this determination, channel occupation/release control unit 24 of the 40-/20-MHz MIMO AP generates a frame (hereafter referred to as "Ch_a occupation declaration frame") F1 to declare for occupation of a first specified period 20M_ch_a and enters a waiting state for transmission of the frame F1. The carrier sense unit 22 of the 40-/20-MHz MIMO AP determines that empty conditions are satisfied when the 20M_ch_a becomes an idle state and the idle state has been continued during an arbitration inter frame space (AIFS) period. Then, the channel occupation/release control unit 24 receives the determination result that the empty conditions are satisfied from the carrier sense unit 22 and starts countdown of a backoff counter. When the backoff counter indicates zero, the 40-/20-MHz MIMO AP transmits the frame F1 through the 20M_ch_a by using the first PHY layer protocol processing unit 11.

Where, it is assumed that a value in the maximum priority is set as an initial value of the backoff counter of an AIFS 50 and a backoff 51 corresponding to the waiting time before transmission of the frame F1 so that the 40-/20-MHz MIMO AP acquires a medium in preference to other terminals. For example, the value of the AIFS 50 is set to a value shorter than that of any other frame and the maximum value of random numbers to determine the initial value of the backoff counter of the backoff 51 is set to a value smaller that any other frame. For example, the initial value of the backoff counter of the frame F1 may be set to zero (minimum within definition). If the initial value of the backoff counter is zero, the period of the backoff 51 is eliminated and the F1 frame is transmitted without executing the operation of the backoff 51 after termination of the AIFS 50 period.

The carrier sense unit 22 operates in accordance with the preset value of the AIFS 50 and the initial value of the backoff counter of the backoff 51. Thus, the waiting time before transmission of the frame F1 becomes shorter than that of other frames with high possibility, so that the communication apparatus of the first embodiment can preferentially perform channel access.

This suggests that a control frame to reserve a channel for the communication through 40-MHz preferentially acquires channel access right. Thereby, a 40-MHz period can be surely assured in a beacon interval. The communication apparatus can avoid interruptions in procedures of channel reservation during the communication through 40 MHz on a half way due to collision with other frames. Therefore, the communication apparatus can reduce deterioration of channel efficiency resulting from switching to the communication through 40 MHz.

There is a possibility that the frame F1 conflict with other frames and re-transmission is required. In this case, in a protocol of an IEEE 802 series wireless LAN, the maximum value of the random numbers of the backoff counter is usually increased in order to widen a range of selections of the random numbers to avoid re-collision, however, with regard to the frame F1, the maximum value in the random numbers of the backoff counter is not increased even if the collision has occurred. The maximum value of in the random numbers is always maintained at a fixed value with no distinction between the first transmission time and the re-transmission time. Then, the communication system can transmit the frame F1 with a backoff shorter than other frames even if the frame F1 conflicts with other frames. Accordingly, the 40-/20-MHz MIMO AP can acquire a right of channel access in preference to other frames.

The frame F1 may be a control frame and a management frame such as a beacon frame. If the beacon frame is utilized in stead of the frame F1, the highest priority described above is adopted to the beacon frame.

Figure 6:
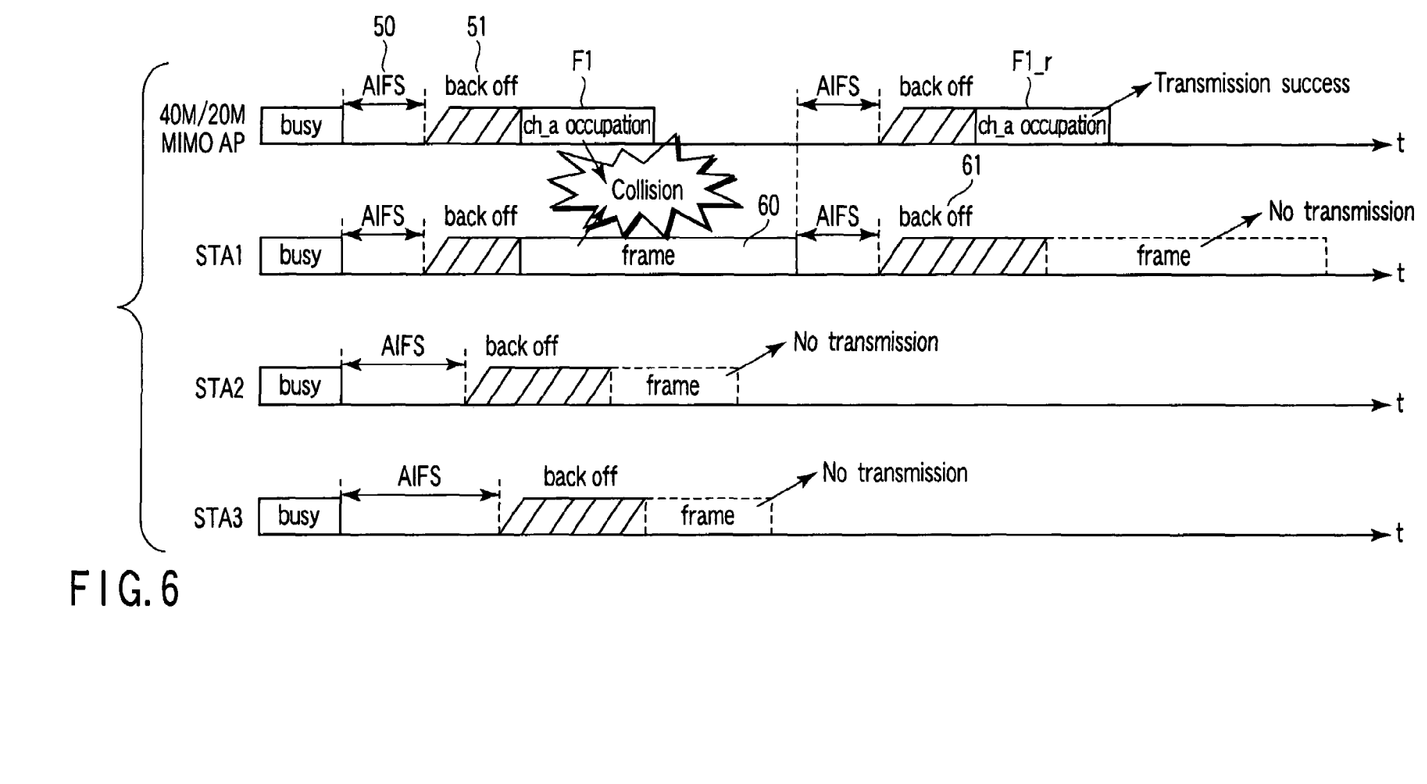
FIG. 6 is an illustration explaining a priority control system regarding the first embodiment of the invention.

FIG. 6 is the illustration explaining the priority control regarding the first embodiment and showing comparison of transmission waiting times between other frames and the Ch_a occupation declaration frame F1. In FIG. 6, each of the MIMO AP, STA 1, STA 2 and STA 3 tries to transmit a frame on the 20M_ch_a. Since the 40-/20-MHz MIMO AP tries to transmit the frame F1, the AIFS and the value of the backoff counter with the highest priority are set. Therefore, the 40-/20-MHz MIMO AP can start transmission of the frame at the time earlier than those of other terminals such as the STA 2, STA 3 and acquire the right of the channel access.

In the case, as shown in FIG. 6, if there exists a terminal to start transmission of a frame 60 at the same time as the 40-/20-MHz MIMO AP starts it and the frame 60 conflicts with the frame F1, generally, a value of a backoff counter of backoff 61 is increased at the time of re-transmission of the frame 60 as the STA 1 does. However, with respect to the frame F1, the maximum value of the random numbers of the backoff counter is not increased, so that the 40-/20-MHz MIMO AP acquires the right of the channel access for re-transmission and successfully transmits a Ch_a occupation declaration frame F1_r.

Other STA which has received the frame F1 (or frame F1_r) sets the carrier sense state of the MAC layer to a busy state for a specified period and switches the PHY mode from the 20M_ch_a to the 40M_ch at the same time. Thus, the operation mode of the network 100 is switched to the 40M_ch.

Next, as shown in FIG. 5, a base station 101 (40-/20-MHz MIMO AP) switches the PHY mode to the 20M_ch_b. After this switching, the 40-/20-MHz MIMO AP waits until an idle state has continued by the AIFS 50 period and transmits a frame (hereinafter referred to as "Ch_b occupation declaration frame") F2 to declare occupation of the 20M_ch_b during a specified period.

Similar to the case of the frame F1, a value in the highest priority class as an AIFS 52 corresponding to a waiting time before transmitting the frame F2 sin is set so that the 40-/20-MHz MIMO AP acquires a medium in preference to other terminals. For example, the value of the AIFS 52 is set to a value smaller than that of any other frame. Then, the waiting time before transmitting the frame F2 becomes high at a high possibility, the 40-/20-MHz MIMO AP can perform the channel access with priority.

Here, the frame F2 may be transmitted after performing backoff in a similar way to the case of the frame F1 after elapse of the period of the AIFS 52. If the backoff is performed even at the time of the transmission of the frame F2 like the case of the frame F1, it is assumed that the value in the highest priority class is set as an initial value of the backoff counter. It is also the same case as that of the frame F1 in a point that the maximum value of the random numbers is always maintained at the fixed value with no distinction between the first transmission time and the re-transmission time.

Other STA which has received the frame F2 sets a carrier sense state of a MAC layer of the 20M_ch_b to a busy state for a specified period. Since the frame F2 is transmitted thorough the 20M_ch_b, the 20-MHz MIMO STA (20M_ch_a) and the 20-MHz STA (20M_ch_a) operating by the 20M_ch_a do not receive the frame F2.

Next, the 40-/20-MHz MIMO AP changes the PHY mode to the 40M_ch. After this switching, the 40-/20-MHz MIMO AP transmits a frame (hereinafter referred to as 40M_ch release frame) F3 to release the 40M_ch which has been occupied by the 40-/20-MHz MIMO AP after a lapse of a period of an AIFS 53. Where, since the 40-/20-MHz MIMO AP holds the medium of the 40M_ch, the 40-/20-MHz MIMO AP does not always have to confirm a continuation of the period of the AIFS 53 but may confirm the continuation.

Other STA which has received the frame F3 sets the carrier sense state of the MAC layer of the 40M_ch to an idle state during a specified period. At this point of time, each 40-/20-MHz MIMO AP, 40-/20-MHz MIMO STA and 40-/20-MHz STA operating through the 40M_ch is brought into idle states of the carrier senses of the MAC layers, respectively. After this, frame exchanges of the 40N_ch are performed while securing media through usual media accesses.

Next, procedures of switching from a mode to communicate by using the 40-MHz channel (40M_ch) to a mode to communicate by using the 20-MHz channel (20M_ch) in the network 100 will be explained. Here, a period to communicate by using the 40M_ch is referred to as "40M_ch period" and a period to communicate by using the 20M_ch is referred to as "20M_ch period".

A 40M_ch period 54 shown in FIG. 5 may terminate naturally with the termination of the occupation period of the 40M_ch period. Or the 40-/20-MHz MIMO AP may transmit a frame explicitly notifying the termination of the 40M_ch (hereinafter referred to as 40M_ch period termination frame) F4. The frame F4 explicitly or implicitly starts a new occupation period of the 40M_ch and instructs switching to the 20M_ch_a.

If the 40M_ch period terminates over time, or if the frame 4 is received, the 40-/20-MHz MIMO AP switches the PHY mode to the 20M_ch and transmits a frame to release the occupation of the 20M_ch_b (hereinafter referred to as Ch_b release frame) F5.

Similarly to the case of the frame F1, it is assumed that a value with the highest priority class as an AIFS 55 corresponding to a waiting time before transmission of the frame F5 is set so that the 40-/20-MHz MIMO AP acquires the medium with precedence to other terminals. For example, the value of the AIFS 55 is set to a value shorter than that of any other frame. Then, the waiting time before the transmission of the frame F5 has a high possibility to become shorter than those of other frames, and the 40-/20-MHz MIMO AP becomes possible to perform channel access with precedence to other terminals.

The STA which has received the frame F5 sets a carrier sense state of a MAC layer of the 20M_ch_b to an idle state. Thereby, the 20-MHz MIMO STA (20M_ch_b) and the 20-MHz STA (20M_ch_b) can start frame exchange in the 20M_ch_b.

Next, the 40-/20-MHz MIMO AP switches the PHY mode to the 20M_ch_a and transmits a frame to release an occupation state of the 20M_ch_a (hereinafter referred to as Ch_a release frame) F6.

Similarly to the case of the frame F1, it is assumed that a value with the highest priority class as an AIFS 56 corresponding to a waiting time before transmission of the frame F6 is set so that the 40-/20-MHz MIMO AP acquires the medium with precedence to other terminals. For example, the value of the AIFS 56 is set to a value shorter than those of other frames. Then, the waiting time before the transmission of the frame F6 has a high possibility to become shorter than those of other frames, and the 40-/20-MHz MIMO AP becomes possible to perform channel access with precedence to other terminals.

The STA which has received the frame F6 sets a carrier sense state of a MAC layer of the 20M_ch_a to an idle state. Whereby, the 40-/20-MHz MIMO STA, 40-/20-MHz STA, 20-MHz MIMO STA (20M_ch_a) and 20-MHz STA (20M_ch_a) can start frame exchanges in the 20M_ch_a, respectively.

As mentioned above, the operation mode of the network 100 can be surely switched from the 40M_ch to the 20M_ch or from the 20M_ch to the 40M_ch by giving a priority of media acquirement to a control frame for 40-MHz channel reservation/release such as the frame F1, F2, F5 and F6.

Second Embodiment

The first embodiment described above assumes a network with central control by the access point (AP), however, a second embodiment of the invention is different from the first embodiment in a point that the second embodiment assumes a network with distributed control only having terminals (STAs) as constituent elements. Hereinafter, the second embodiment will be described with a focus on different points from the first embodiment.

Figure 7:
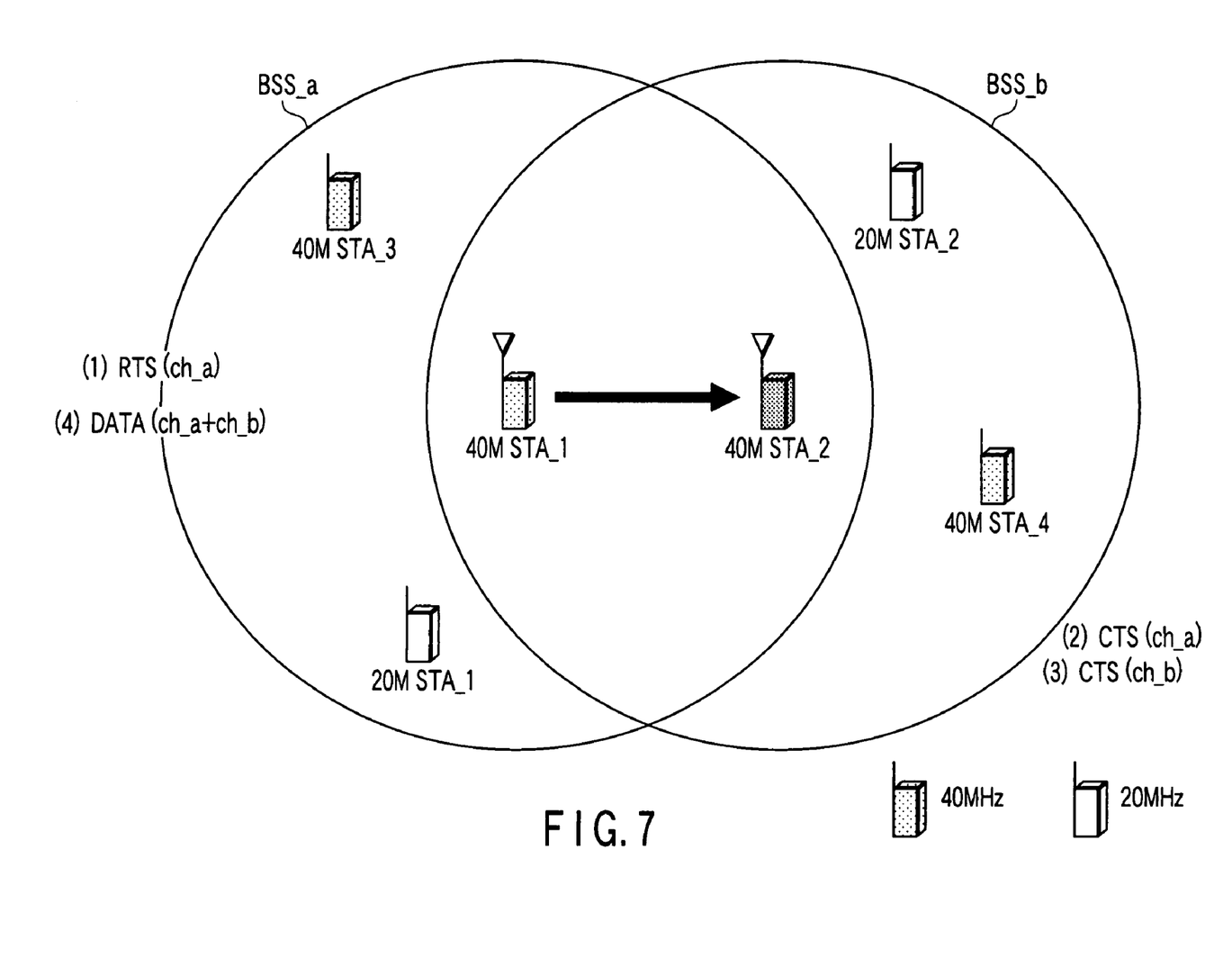
FIG. 7 is an illustration showing a network configuration regarding a second embodiment of the invention.

FIG. 7 shows the network configuration according to the second embodiment regarding the invention. FIG. 7 shows the situation in which a 40-MHz STA_1 attempts to transmit a frame to a 40-MHz STA_2 by using the 40-MHz channel. The 20_ch_a and the 20_ch_b operate in different basic service sets (BSSs) and independently accept media access. An example in FIG. 7, a BSS_a connected to the 40-MHz STA_1 uses the 20M_ch_a and a BSS_b adjacent to the BSS_a or overlapped therewith uses the 20M_ch_b.

In the 20M_ch_a, media access by the DCF or the EDCA is performed. In contrast, in the 20M_ch_b, any one of the media access by the DCF, EDCA, PCF or HCCA. In FIG. 7, both 20M_ch_a and 20M_ch_b are corresponding to the case with the DCF or the EDCA is performed therein.

Figure 8:
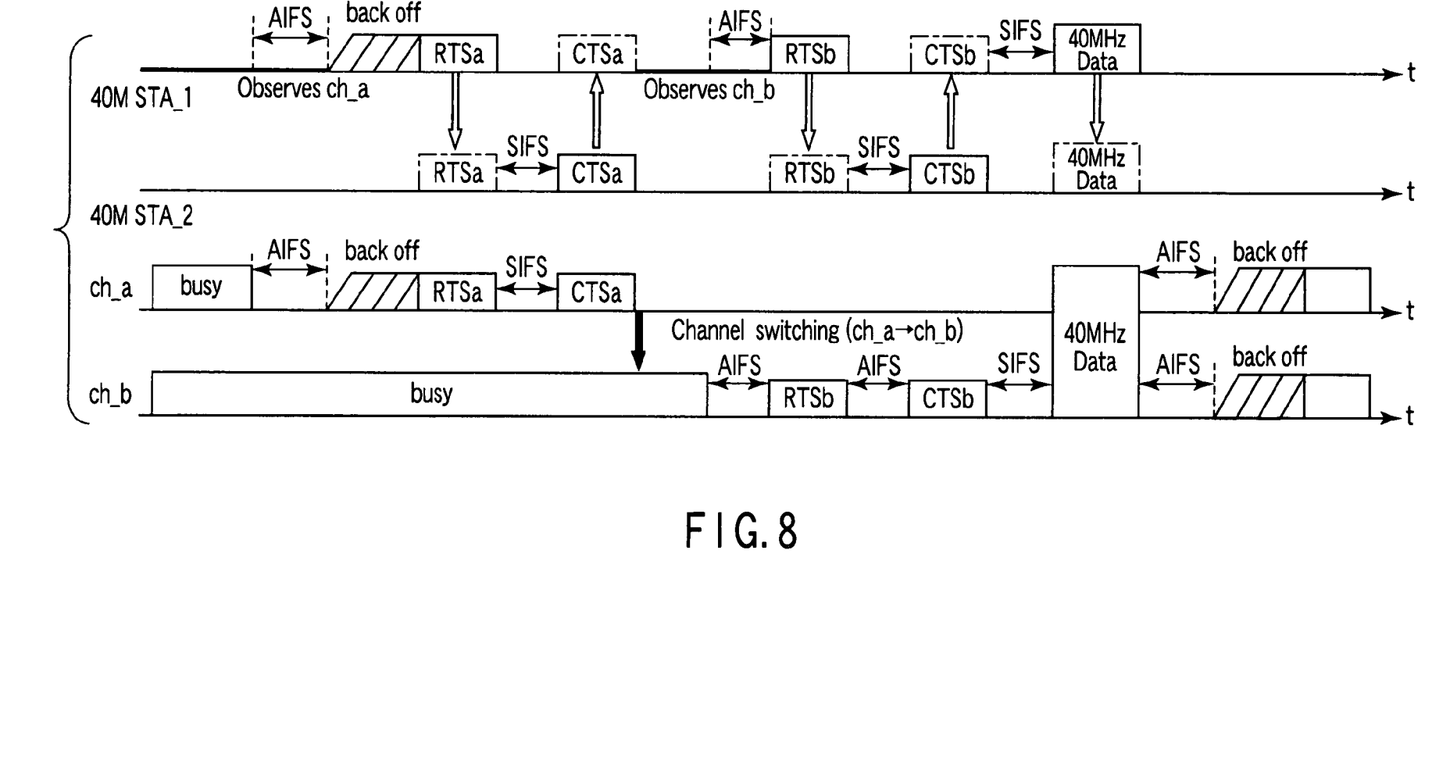
FIG. 8 is an illustration explaining a media access system regarding the second embodiment of the invention.

A physical mode and carrier sense state control in the network configuration of distributed control having only terminals (STAs) as constitution elements will be described by referring to FIG. 8.

At first, the 40-MHz STA_1 performs carrier sense of the 20M_ch_a and waits until the 20M_ch_a becomes an idle state over an AIFS period. When the idle state during the AIFS period is detected, the 40 M STA_1 starts countdown of a backoff counter. The 40-MHz STA_1 transmits an RTSa frame to the 40-MHz STA_2 by using the 20M_ch_a when the backoff counter reaches zero, and waits for reception of a frame from the 40-MHz STA_2. The RTSa frame is one of the RTS frame or its expansion defined in IEEE 802.11.

Where, it is assumed that a value with the highest priority class is set as an initial value of the AIFS and the backoff counter equivalent to the waiting time before transmission of the RTSa frame. For example, the AIFS value is set to a value smaller than any other frame and a maximum value of random numbers to determine the initial value of the backoff counter is set to a value smaller that any other frame.

For example, the initial value of the backoff counter of the RTSa frame may be zero (minimum within limit). If the initial value of the backoff counter is zero, a backoff period in FIG. 8 is eliminated and the RTSa frame is transmitted after termination of the AIFS without having to perform an operation of backoff. Then, the waiting time before the transmission of the RTSa frame has a high possibility to become shorter than those of other frames, and it becomes possible for the 40-MHz STA_1 to perform channel access with precedence to other terminals.

The case of occurrence of necessity of retransmission should be considered due to a collision of the RTSa frame with other frame. The collision of the RTSa frame with other frame is detected by the fact that a response of a CTSa frame described below is not transmitted from the 40-MHz STA_2. In this case, in a protocol of an IEEE 802 series wireless LAN, a maximum value among the random numbers of the backoff counter is generally increased in the aim of avoidance of re-collision. However, with respect to the RTSa frame, the 40-MHz STA_1 does not increase the maximum value among the random numbers of the backoff counter. The 40-MHz STA_1 maintains the maximum value of the random numbers of the backoff counter always constant without distinction between the first time of frame transmission and the time of frame retransmission. Thereby, since the 40-MHz STA_1 can transmit a frame with backoff shorter than those of other frames at the time of retransmission even if the RTSa frame conflicts with other frame, the 40-MHz STA_1 can a C quire the right of the channel access with precedence.

The 40-MHz STA_2 which has received the RTSa frame, replies the CTSa frame to the 40-MHz STA_1 by using the 20M_ch_a when an SIFS time has elapsed after termination of reception of the RTSa frame and starts carrier sense of the 20M_ch_b. The 40-MHz STA_2 switches an operation mode of a PHY layer for the carrier sense of the 20M_ch_b if the 40-MHz STA_2 can not treat only single channel at once. The CTSa frame may be a usual CTS defined by IEEE 802.11.

The RTSa frame transmitted by using the 20M_ch_a or each 40-MHz STA which has received the CTSa frames and each 20-MHz STA belonging to the BSS_a are inhibited to perform transmission until a scheduled time of termination of transmission of data frames. It is assumed that a reservation of the 20M_ch_a for the 40-MHz STA_1 is terminated when the 40-MHz STA_1 receives the CTSa frame from the 20M_ch_a.

A BSS_b is considered to perform the DCF or the EDCA.

The 40-MHz STA_1 with the CTSa frame received therein switches an operation mode of a PHY layer to the 20M_ch_b if the 40-MHz STA_1 can treat a single channel at once. The 40-MHz STA_1 performs carrier sense of the 20M_ch_b and waits until the 20M_ch_b will be in an idle state over an AIFS period. If the idle state of the AIFS period is detected, the 40-MHz STA_1 transmits the RTSb frame to the 40-MHz STA_2 by using the 20M_ch_band and enters a reception waiting of a frame form the 40-MHz STA_2. The RTSb frame is one of an RTS frame or its expansion defined by IEEE 802.11.

Here, it is assumed that a value with the highest priority class is set as an initial value of an AIFS and a backoff counter equivalent to a waiting time before transmission of the RTSb frame so that the 40-MHz STA_1 acquires media with precedence to other terminals. For example, the AIFS value is set to a value shorter than any other frame and the maximum value of the random numbers of the backoff counter is set to a value smaller than those of any other frames. The maximum value of the random numbers to determine the initial value of the backoff counter may be always set to zero. In this case, as shown in FIG. 8, the RTSb frame is transmitted just after a lapse of the AIFS with no operation of backoff. Thereby, the waiting time before the transmission of the RTSb frame has a high possibility to become shorter than those of other frames, and it becomes possible for the 40-MHz STA_1 to perform channel access with precedence to other terminals.

The case of a collision of the RTSb frame with other frame and an occurrence of need of retransmission should be taken into account. The collision of the RTSb frame with other frame is detected by the fact that a response of a CTSb frame described below is not transmitted from the 40-MHz STA_2. In this case, in a protocol of an IEEE 802 series wireless LAN, a maximum value among the random numbers of the backoff counter is generally increased in the aim of avoidance of re-collision. However, with respect to the RTSb frame, the 40-MHz STA_1 does not increase the maximum value among the random numbers of the backoff counter. The 40-MHz STA_1 maintains the maximum value of the random numbers of the backoff counter always constant without distinction between the first time of frame transmission and the time of frame retransmission. Thereby, since the 40-MHz STA_1 can transmit a frame with backoff shorter than those of other frames at the time of retransmission even if the RTSa frame conflicts with other frame, the 40-MHz STA_1 can acquire the right of the channel access with precedence.

The 40-MHz STA_1 may determine transmission time of the RTSb frame in response to a channel switching time required by the 40-MHz STA_2 to be a communication partner. If the 40-MHz STA_2 cannot treat only a single channel at once, the 40-MHz STA_2 switches the operation mode of the PHY layer to the 20M_ch_a for the carrier sense of the 20M_ch_b after transmission of the CTSa. Assuming that the time required to switch the operation mode of the PHY layer from the 20M_ch_a to the 20M_ch_b is, for example, 100 μsec, the 40-MHz STA_1 sets a transmission time of the RTSb frame to a time 100 μsec being a later time of reception of the CTSa. Assuming that the 40-MHz STA_1 transmits the RTSb frame before the lapse of 100 μsec, since the 40-MHz STA_2 has not completed the switching of the operation mode of the PHY layer, the 40-MHz STA 2 can not receive the RTSb frame. If the 40-MHz STA_1 transmits the RTSb frame in response to the channel switching time of the 40-MHz STA_2, the 40-MHz STA_2 can avoid a failure of reception of the RTSb frame. In contrast, if the channel switching time of the 40-MHz STA_1 is longer than the channel switching time of the 40-MHz STA_2, the 40-MHz STA_1 may transmit the RTSb frame at transmission timing in response to the channel switching time of its own terminal.

With regard to a method for acquiring channel switching time information on the 40-MHz STA_2 by the 40-MHz STA_1, the following one can be taken into account. For example, The 40-MHz STA_1 and the 40-MHz STA_2 may store channel switching time information respecting to their own terminals into RTSa/CTSa frames, respectively, and notify the channel switching time information to partner terminals by such RTSa/CTSa frames, respectively. Or the 40-MHz STA_1 and the 40-MHz STA_2 may provide a period for channel switching information exchange before the 40-MHz STA_1 transmits the RTSa frame and exchange the channel switching time information with each other.

Moreover, a method can be also taken into consideration that each terminal such as the 40-MHz STA_1 and the 40-MHz STA_2 notifies to peripheral terminals by periodically broadcasting the channel switching time of their own terminals and each terminal collects the broadcasted channel switching times to constantly store them as view tables at each terminal.

The channel switching times may be those required to switch between a ch_a and a ch_b and may be others required to switching between communication with only the single ch_a or the ch_b used therein and communication with both ch_a and ch_b are used therein (for change, i.e., expansion/ reduction of channel bandwidth).

The 40-MHz STA_2 which has received the RTSb frame replies the CTSb frame to the 40-MHz STA_1 by using the 20M_ch_b at a SIFS time after termination of reception of the RTSb frame.

After this, if the 40-MHz STA_2 can treat only a single channel at once, the 40-MHz STA_2 switches the operation mode of the PHY layer to the 40M_ch so as to receive a data frame from the predicted 40-MHz STA_1.

Each 20-MHz STA belonging to the BSS_b which has received the CTSb frame is inhibited to transmit frames until scheduled time of termination of transmission of data frames. It is assumed that a reservation of the 20M_ch_b for the 40-MHz STA_1 is completed when the 40-MHz STA_1 receives the CTSb frame from the 20M_ch_b.

Accordingly, the 40-MHz STA_1 determines that both 20M_ch_a and 20M_ch_b can be reserved, and transmits data frame for the 40-MHz channel by using both 20M_ch_a and 20M_ch_b. Here, if the 40-MHz STA_1 can treat only a single channel at once, the 40-MHz STA_1 changes the operation mode of the PHY layer to the 40 M_ch.

As described above, according to the second embodiment, the operation mode of the network shown in FIG. 7 can be surely changed from the 20M_ch to the 40M_ch by imparting the right of the priority of media acquisition to a control frame for the 40-MHz channel such as the RTSa frame and the RTSb frame.

The communication apparatus in the second embodiment can avoid transmission of the RTSb frame although the 40-MHz STA_2 has not completed the preparation for reception of the 40-MHz STA_2 by determining the transmission time of the RTSb frame by the 40-MHz STA_1 in response to the channel switching time of the 40-MHz STA_2.

Third Embodiment

A third embodiment of the invention takes the network with the same configuration as that of in FIG. 1 into account. More specifically, the third invention relates to connection control to form the network (BSS) 100 shown in FIG. 3.

In the base station 101 (40-/20-MHz MIMO AP) shown in FIG. 3, the first PHY layer protocol processing unit 11 periodically broadcasts the beacon frames by using the channel 20M_ch_a under control by the network system management unit 25. On the other hand, any terminal 102-106 can receive the beacon frames thorough passive scan of the 20M_ch_a then the terminals 102-106 recognize the presence of the base station 101, i.e., the network 100. Or the terminals 102-106 can recognize the presence of the base station 101, i.e., the network 100 by performing active scan to transmit probe request frames by themselves by using the 20M_ch_a and receive probe response frames corresponding to the request frames from the base station 101.

The 40-/20-MHz MIMO AP being the base station 101 basically operates thorough the 20M_ch_a and the 40M_ch and temporally performs transmitting/receiving through the 20M_ch_b so as to switch to the 40M_ch, etc. described below. At this time, the base station 101 ignores a probe request to the 20M_ch_b and does not make any probe response.

The terminals 102-106 select the base station 101 (network 100) should be connected therewith, based on the information included in the acquired beacon frames or the probe response frames resulting from scanning of a plurality of channels.

Particularly in the third embodiment, the beacon frames or the probe response frames to be transmitted from the 40-/20-MHz MIMO AP include information about channel switching time (channel switching time threshold T_AP) between the 20M_ch_a and the 20M_ch_b and/or communication bandwidth switching time (communication bandwidth switching time threshold) (hereinafter collectively referred to as "access point information") allowed in the BSS managed by the base station 101 to transmit the beacon frames and the prove response frames.

The terminals 102-104 select the base station 101 (network 100) with also reference to such the access point information. For, example, the 40-/20-MHz terminals 102, 103, 104 do not respectively connect to the base station 101 if the switching times of their own terminals are longer than the switching time information of the base station 101 by comparing the access point information broadcasted from the base station 101 with the channel switching time between the 20M_ch_a and the 20M_ch_b of their own terminals or the communication bandwidth switching time between the 20M_ch and the 40M_ch. In contrast, if switching times of their own terminals are shorter than the switching time information of the base station 101, they respectively select to connect to the base station 101.

It is assumed that the terminals 105, 106 (20-MHz STAs) cannot understand information relating to 20-/40-MHz channel switching time included in the beacon frames or the beacon response frames from the base station 101. Accordingly, the information does not influence the selection for the base station 101 respectively performed by the terminals 105, 106 (20-MHz STA)

Figure 9:
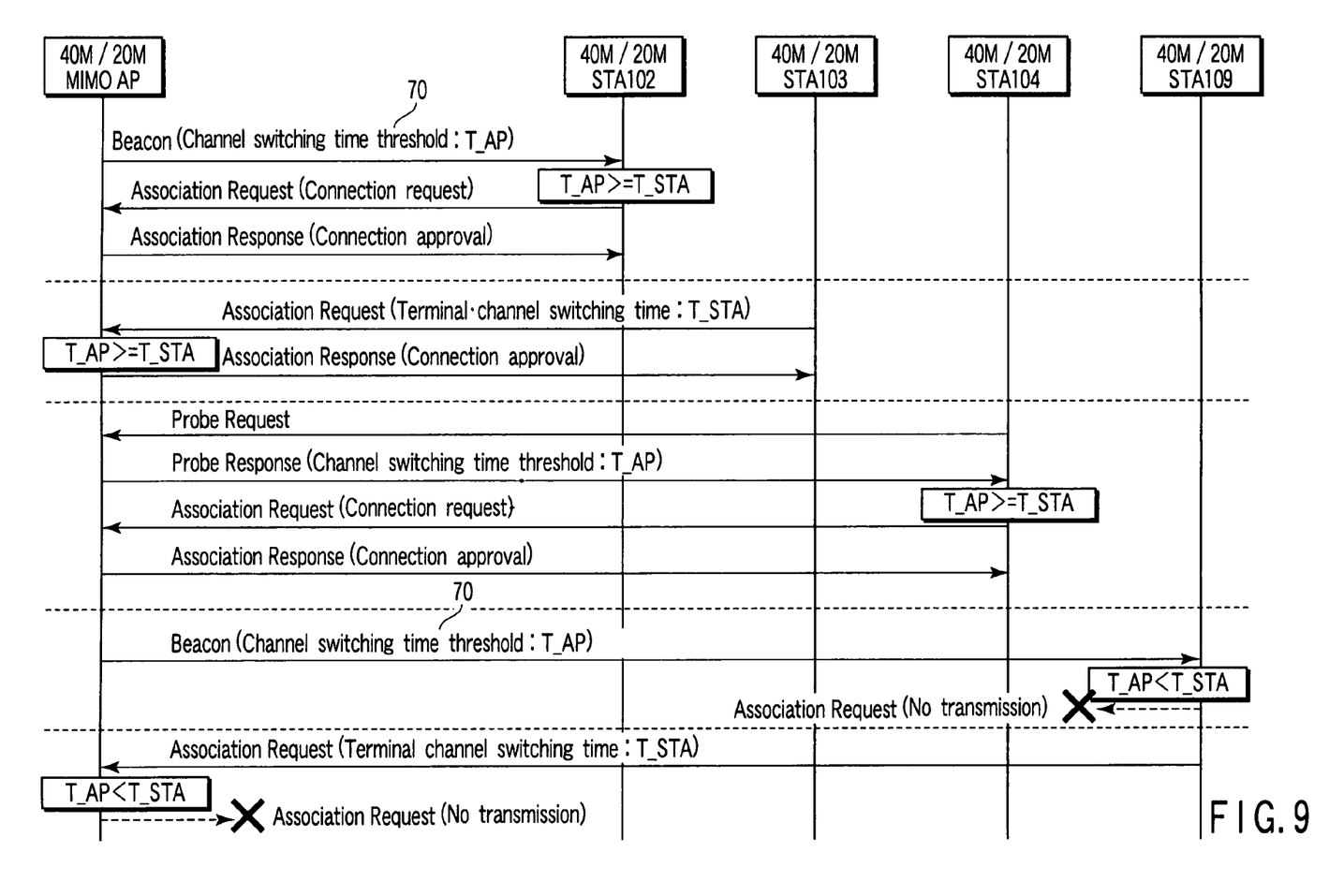
FIG. 9 is an illustration showing an example of a connection sequence regarding a third embodiment of the invention.

FIG. 9 shows an example of connection sequence in the network 100. The connection sequence is performed though the channel (where, 20M_ch_a) with reception of the beacon/ probe response in which the terminals 102-104 has found the network 100. Where, authentication is originally performed before association, however, the authentication is eliminated in FIG. 9 and in the following description.

The 40-/20-MHz MIMO AP being the base station 101 periodically broadcasts a beacon (40-/20-MHz MIMO 4×) 70 to be a beacon frame indicating support for the 40-MHz channel and the 20-MHZ channel. The beacon frame 70 includes threshold information T_AP of the channel switching time allowed in the BSS managed by the base station 101. The terminals 102-106 (40-/20-MHz MIMO STA, 40-/20-MHz STA and 20-MHz STA) receive broadcasted beacon frame (40-/20-MHz MIMO 4×) 70, compare thresholds of the allowed channel switching times with the channel switching times required by their own terminals and select to connect to the network 100 if the channel switching times of their own terminals are smaller than the threshold broadcasted from the base station 101.

According to the selection, the terminals 102-104 (40-/20-MHz MIMO STA, 40-/20-MHz STA) transmit association requests to the base station 101 (40-/20-MHz MIMO AP). The base station 101 (40-/20-MHz MIMO AP) with the association requests to be connection requests received therein replies the association responses to the terminals 101-104 then completes the connection of the terminals 101-104 to the BSS.

The association request being the connection request may includes the 20-/40-MHz channel switching information about the terminals requesting the connection. The base station 101 (40-/20-MHz MIMO AP) with the association requests being the connection requests including the 20-/40-

MHz channel switching time information of the terminals received therein compares the 20-/40-MHz channel switching time information notified from each terminal 102-104 and 109 with a threshold to be an upper limit value of the channel switching time allowed in the BSS managed by the base station 101. The terminals of which the channel switching times are smaller than the threshold among the terminals 102-104 and 109 which have transmitted the association requests (terminals 102-104 except for terminal 109 in FIG. 9) are allowed to enter the BSS managed by the base station 101, and the base station 101 transmits the association responses to the terminals 102-104 to complete the connection of the terminals 102-104 to the BSS. In contrast, the terminal with a channel switching time larger than the threshold (terminal 109 in FIG. 9) among the terminals 102-104 and 109 which have transmitted the association requests is refused to enter the BSS managed by the base station 101. The base station 101 refuses the connection of the terminals 102-104 and 109 to the BSS by responding nothing to the association requests transmitted to the base station 101 from the terminals 102-104 and 109.

In the case that a policy by which each terminal 102-104 and 109 transmits together the 20-/40-MHz channel switching time information of their own terminals is adopted, the beacon frame broadcasted from the base station 101 does not have to include threshold information on the channel switching time allowed in the BSS managed by the base station 101. Because the base station 101 itself can select terminals to be allowed the connection to the BSS in accordance with the 20-/40-MHz channel switching time information of the terminals described in the association requests without notification of the upper limit value of the channel switching time by the base station 101.

As mentioned above, a terminal requiring for a long while for a channel switching time or for a switch time of a communication bandwidth is restricted to enter the BSS by the base station, so that deterioration in channel use efficiency due to the long channel switching time or switching time of the communication bandwidth can be avoided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus for acquiring a first channel and a second channel and performing wireless communication by simultaneously using the first channel and the second channel, comprising:
   a device configured to generate a first frame to occupy the first channel for a specified period and a second frame to occupy the second channel for a specified period;
   a determination device configured to determine whether or not an idle state of either the first channel or the second channel has been continued during a predetermined time period; and
   a transmitting device configured to transmit the first frame after it is determined by the determination device that the idle state of the first channel has been continued during a first time period, and after a second time period has been passed,
   and wherein
   the transmitting device transmits the second frame after transmitting the first frame, and
   before transmitting the second frame, waiting for the second time period is omitted.

2. A wireless communication apparatus for acquiring a first channel and a second channel and performing wireless communication by simultaneously using the first channel and the second channel, comprising:
   a device configured to generate a first frame to occupy the first channel for a specified period and a second frame to occupy the second channel for a specified period;
   a determination device configured to determine whether or not an idle state of either the first channel or the second channel has been continued during a predetermined time period before transmitting frames; and
   a device configured to start countdown of a backoff counter when it is determined by the determination device that the idle state of either the first channel or the second channel has been continued during the predetermined time period; and
   a transmitting device configure to transmit the first frame when the backoff counter indicates zero,
   and wherein
   the transmitting device transmits the second frame after transmitting the first frame, and
   an initial value of the backoff counter is set to be zero before transmitting the second frame.

3. A wireless communication apparatus for acquiring a first channel and a second channel and performing wireless communication by simultaneously using the first channel and the second channel, comprising:
   a device configured to generate a first frame to occupy the first channel for a specified period and a second frame to occupy the second channel for a specified period;
   a determination device configured to determine whether or not an idle state of either the first channel or the second channel has been continued during a predetermined time period before transmitting frames; and
   a backoff device configured to start countdown of a backoff counter when it is determined by the determination device that the idle state of either the first channel or the second channel has been continued during the predetermined time period; and
   a transmitting device configure to transmit the first frame when the backoff counter indicates zero,
   and wherein
   the transmitting device transmits the second frame after transmitting the first frame, and
   the backoff device does not execute countdown of the backoff counter before transmitting the second frame.

4. A wireless communication apparatus for acquiring a first channel and a second channel and performing wireless communication by simultaneously using the first channel and the second channel, comprising:
   a device configured to generate a first frame to occupy the first channel for a specified period and a second frame to occupy the second channel for a specified period;
   a determination device configured to determine whether or not an idle state of either the first channel or the second channel has been continued during a predetermined time period before transmitting frames; and
   a backoff device configured to start countdown of a backoff counter when it is determined by the determination device that the idle state of either the first channel or the second channel has been continued during the predetermined time period; and
   a transmitting device configure to transmit the first frame when the backoff counter indicates zero,
   and wherein the transmitting device transmits the second frame after transmitting the first frame without executing backoff.

5. A wireless communication method by which a wireless communication apparatus acquires a first channel and a second channel and performs wireless communication by simultaneously using the first channel and the second channel, comprising:
generating a first frame to occupy the first channel for a specified period and a second frame to occupy the second channel for a specified period;
determining whether or not an idle state of either the first channel or the second channel has been continued during a predetermined time period; and
transmitting the first frame after it is determined that the idle state of the first channel has been continued during a first time period, and after a second time period has been passed,
and wherein
the transmitting further includes transmitting the second frame after transmitting the first frame, and
before transmitting the second frame, waiting for the second time period is omitted.

6. A wireless communication method by which a wireless communication apparatus acquires a first channel and a second channel and performs wireless communication by simultaneously using the first channel and the second channel, comprising:
generating a first frame to occupy the first channel for a specified period and a second frame to occupy the second channel for a specified period;
determining whether or not an idle state of either the first channel or the second channel has been continued during a predetermined time period before transmitting frames; and
starting countdown of a backoff counter when it is determined that the idle state of either the first channel or the second channel has been continued during the predetermined time period; and
transmitting the first frame when the backoff counter indicates zero,
and wherein
the transmitting further includes transmitting the second frame after transmitting the first frame, and
an initial value of the backoff counter is set to be zero before transmitting the second frame.

7. A wireless communication method by which a wireless communication apparatus acquires a first channel and a second channel and performs wireless communication by simultaneously using the first channel and the second channel, comprising:
generating a first frame to occupy the first channel for a specified period and a second frame to occupy the second channel for a specified period;
determining whether or not an idle state of either the first channel or the second channel has been continued during a predetermined time period before transmitting frames; and
starting countdown of a backoff counter when it is determined that the idle state of either the first channel or the second channel has been continued during the predetermined time period; and
transmitting the first frame when the backoff counter indicates zero,
and wherein
the transmitting includes transmitting the second frame after transmitting the first frame, and
countdown of the backoff counter is not executed before transmitting the second frame.

8. A wireless communication method by which a wireless communication apparatus acquires a first channel and a second channel and performs wireless communication by simultaneously using the first channel and the second channel, comprising:
generating a first frame to occupy the first channel for a specified period and a second frame to occupy the second channel for a specified period;
determining whether or not an idle state of either the first channel or the second channel has been continued during a predetermined time period before transmitting frames; and
starting countdown of a backoff counter when it is determined that the idle state of either the first channel or the second channel has been continued during the predetermined time period; and
transmitting the first frame when the backoff counter indicates zero,
and wherein
the transmitting includes transmitting the second frame after transmitting the first frame without executing backoff.

* * * * *